(12) United States Patent
Davidson et al.

(10) Patent No.: US 6,804,692 B2
(45) Date of Patent: Oct. 12, 2004

(54) METHOD AND APPARATUS FOR REASSEMBLY OF DATA BLOCKS WITHIN A NETWORK PROCESSOR

(75) Inventors: Joel R. Davidson, Austin, TX (US); James T. Kirk, Austin, TX (US); Mauricio Calle, Austin, TX (US)

(73) Assignee: Agere Systems, Inc., Allentown, PA (US)

(*) Notice: Subject to any disclaimer, the term of this patent is extended or adjusted under 35 U.S.C. 154(b) by 423 days.

(21) Appl. No.: 10/037,082

(22) Filed: Dec. 21, 2001

(65) Prior Publication Data

US 2003/0120664 A1 Jun. 26, 2003

(51) Int. Cl.$^7$ ................................................. G06F 7/00
(52) U.S. Cl. ........................ 707/704.1; 700/101; 700/1; 700/10
(58) Field of Search .................. 707/1–10, 100–104.7, 707/205; 370/310, 345, 349, 229, 235, 400, 401, 351, 389, 473, 474, 270.1, 230, 392, 412, 471, 464–465, 470, 498, 522, 528; 714/699, 746, 748, 250, 752, 776; 709/200, 245, 230–233, 236–237, 219; 710/100; 395/200.49; 711/209

(56) References Cited

U.S. PATENT DOCUMENTS 4,493,021 A * 1/1985 Agrawal et al. ............ 709/236
5,113,392 A * 5/1992 Takiyasu et al. ............ 370/473
5,577,041 A * 11/1996 Sharma et al. .............. 370/271
5,600,649 A * 2/1997 Sharma et al. .............. 370/435
5,809,024 A    9/1998 Ferguson et al.
5,815,503 A * 9/1998 Li ............................... 370/471
6,275,502 B1 * 8/2001 Arimilli ....................... 370/468
6,643,298 B1 * 11/2003 Brunheroto et al. ........ 370/537
6,667,978 B1 * 12/2003 Delp et al. ................ 370/395.1

FOREIGN PATENT DOCUMENTS

| EP | 0 752 798 A2 | 1/1997 |
| EP | 1 170 975 A1 | 1/2002 |
| EP | 1 172 974 A2 | 1/2002 |
| EP | 1 322 081 A2 | 6/2003 |

OTHER PUBLICATIONS

Welin, "Systems, processes and integrated circuits for improved packet scheduling of media over packet", United Patent Application Publication, Mar. 14, 2002.*

* cited by examiner

Primary Examiner—Greta Robinson
Assistant Examiner—Linh Black (57) ABSTRACT

A method and apparatus for reassembling data blocks back into their constituent data packets in a network processor. Each data block associated with a packet is assigned a unique queue identifier for use in assembling all blocks from the same packet. The packet is also assigned a packet identifier, a start of packet identifier and an end of packet identifier for use by downstream network processors to process the packet. The blocks are assembled according to the assigned queue identifier until the last block of a packet is received, at which time the packet reassembly is complete.

25 Claims, 5 Drawing Sheets

FIG. 1

| END OF FIELD INDICATOR | VALUE READ FROM QID VALID MEMORY | STATE | OUTPUT PID | SOP | EOP | VALUE WRITTEN TO QID VALID MEMORY |
|---|---|---|---|---|---|---|
| 0 | 0 | START OF REASSEMBLY | NEW | 1 | 0 | 1 |
| 0 | 1 | MIDDLE OF REASSEMBLY | LOOKUP | 0 | 0 | 1 |
| 1 | 1 | END OF REASSEMBLY | LOOKUP | 0 | 1 | 0 |
| 1 | 0 | SHORT PACKET | NEW | 1 | 1 | 0 |

METHOD AND APPARATUS FOR REASSEMBLY OF DATA BLOCKS WITHIN A NETWORK PROCESSOR

FIELD OF THE INVENTION

The present invention relates generally to the processing of data packets in a network processor, and more specifically, to the reassembly of data blocks into the form of a data packet from which they were initially partitioned.

BACKGROUND OF THE INVENTION

Computer or data networks allow users to share or multiplex resources such as printer servers, routers, file systems, long-distance data trunks, search engine servers and web site servers. Data transmitted through a network is typically segmented into finite portions or blocks. Under some network protocols, the data is segmented into fixed-length cells. For example, in the asynchronous transfer mode (ATM) protocol data is segmented into 53-byte cells, with 5 bytes of each cell designated for a header (also referred to as meta-data) and 48 bytes of each cell designated for the payload or information. Other network protocols, such as the Ethernet protocol, allow data segmentation into variable-length packets. For example, an Ethernet packet has a 14-byte header and a payload size that can vary from 64 bytes to 1,500 bytes.

Processing fixed-length packets, such as ATM cells, through a network processor, such as a switch, is easier than processing variable-length packets. Since the length of each fixed-length packet is known, the propagation time through a switch is predictable and it is therefore easier to arrange for the packets to pass through the switch one after another in a pipelined fashion, i.e., the packets are transferred over a single data path in series with no gap between the adjacent packets.

In contrast to the fixed length packets, the time required to process variable-length packets through a switch or other network processors varies. Thus it is difficult to pipeline variable-length packets. Further, the variable-length packet creates system timing uncertainties as it is difficult to properly time certain events, such as scheduling data arbitration and the retrieval of packets from buffers, when the processing time for the previous packet is not known a priori.

To make processing of variable-length packets more manageable, variable-length packets are segmented into fixed-length blocks that pass through a switch fabric or other network processor in a known and fixed time. The fixed-length blocks have a header portion and a payload portion and the number of fixed-length blocks per packet is directly related to the size of the packet. The fixed-length blocks are used only internal to the network processor and are maintained in order during processing. The blocks are reassembled back into packet form prior to transmittal to the downstream network processor.

Variable length data packets may also be segmented into data blocks for the purpose of applying error control functionality to the blocks. In this way, not only will a concatenated sequence of data blocks be protected against errors, but each block within the sequence will also be protected.

BRIEF SUMMARY OF THE INVENTION

The present invention describes a method and apparatus for the reassembly of data blocks back into the packet (or PDU, packet data unit) from which they were previously segmented for ease in processing through a network processor, such as a network switch. Prior to beginning the reassembly process, each block is assigned a queue identifier that is uniquely associated with the packet from which the blocks were partitioned and into which they will be reassembled. Once the first block of a packet is assigned a queue identifier, that queue identifier is rendered unavailable for assignment until the reassembly process for that packet is complete. A packet identifier is assigned to each packet, as well as a start-of-packet and an end-of-packet identifier that are useful during packet processing by downstream network processors. The packet reassembly process is terminated when the block carrying an end-of-field identifier, indicating that it is the last block for the packet, is added to the reassembled packet. According to the present invention, packets of any length and protocol can be reassembled from their constituent blocks.

BRIEF DESCRIPTION OF THE FIGURES

The present invention can be more easily understood and the further advantages and uses thereof more readily apparent, when considered in view of the detailed description of the invention and the following figures in which.

DETAILED DESCRIPTION OF THE INVENTION

For efficient and timely processing of variable-length network packet data, certain network processors segment the data packets into fixed-length data blocks. After the network processor has completed operating on or processing the individual blocks, the blocks must be reassembled into the form of the original packet before transmittal to the next network processor in the data path. For example, if the network processor is a switch, the individual data blocks of a packet are switched from the input to the output port as required, then reassembled back into the form of a packet before passing out of the switch to the upstream network processor. According to the teachings of the present invention, the packets are reassembled seamlessly, even though the blocks may have been segmented from packets structured according to different protocols or packets of different lengths.

When a packet is segmented into data blocks, certain packet-level parameters are included within each block. These include the address of the source from which the packet originated, and an indication of the first and last block of the packet. In one embodiment, each block includes a first-block field and a last-block field. A specific indicator is placed in those fields to designate a block as the first or the last block of a packet.

Figure 1:
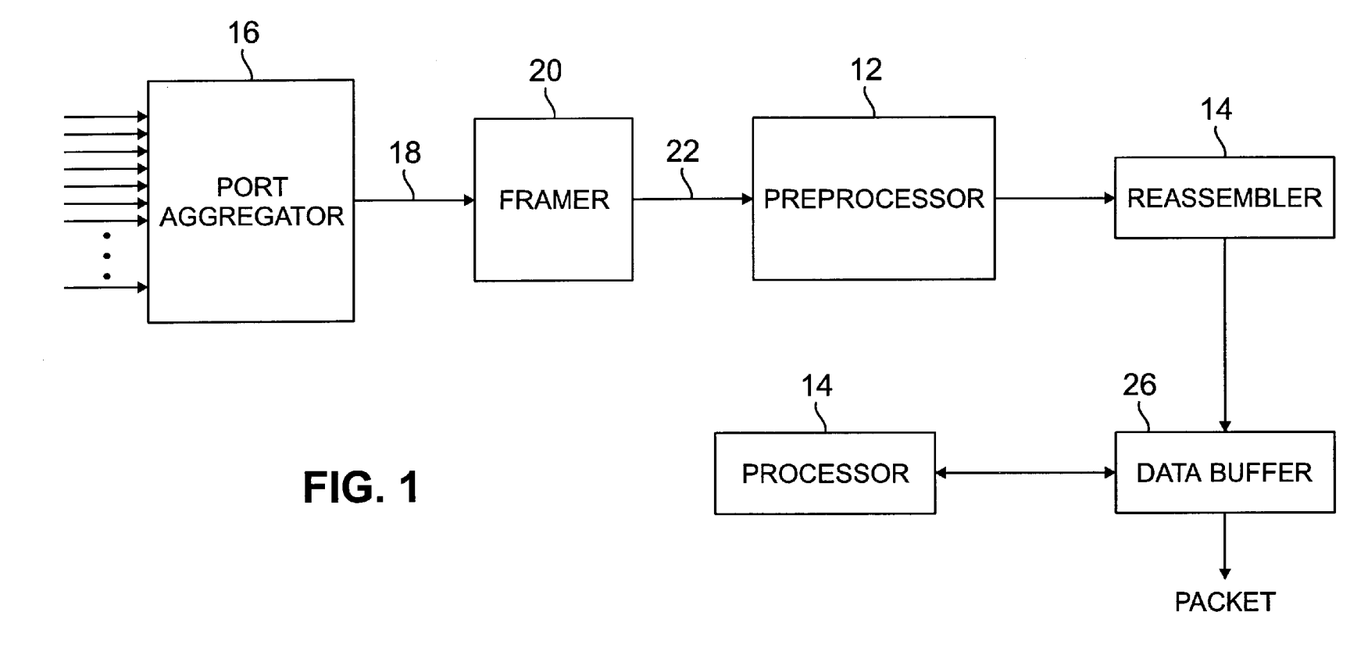
FIG. 1 is a block diagram of the principle components for executing the reassembly process.

According to the teachings of the present invention, the block reassembly process is executed by a preprocessor 12, followed by a reassembler 14 as shown in FIG. 1. In one application of the present invention, prior to entering the preprocessor 12, a port aggregator 16 combines data packets from multiple sources (256 in one embodiment) and determines the packet source based on data in the packet header. As is known, it is likely that the packets from the 256 sources were further aggregated from multiple sources in another port aggregator upstream of the port aggregator 16. The port aggregator 16 segments the packets into fixed-sized data blocks, retaining the packet source identity in each block and also indicating if a block is the first or the last block of a packet. Since packets from different sources appear at the port aggregator 16 simultaneously, the process of segmenting the packets into blocks results in interleaved blocks from different packets. However, the individual blocks of one packet are maintained in sequence, so that as the packet is reassembled, the blocks of the packet will be properly ordered.

The blocks are carried over a data link 18 and input to a framer 20, where error-checking is performed. In one embodiment, the framer segments the blocks into smaller blocks, still retaining the packet identity and first and last block information. The data blocks are carried over a data bus 22, where the blocks are in a specified format that includes the packet source identity and the first and last block information.

In the preprocessor 12, each data block is assigned a queue identifier (QID) based on the packet source information in the block. Thus all blocks partitioned from a packet will bear the same QID. Also, all blocks from one source must be reassembled back into the packet before other blocks from the same source can be reassembled All the blocks with the same QID are reassembled into the packet in the reassembler 14 as described below.

The preprocessor 12 also reads the last block field and in response thereto assigns an end-of-frame indicator to the last block of a packet, for use by the reassembler 14 to terminate the packet reassembly process. The indicator is a single bit included within the block. In a preferred embodiment, a zero value indicates that the block is not the end of the packet and a one value indicates that the block is the last block of the packet.

As the packets are reassembled in the reassembler 14, a unique packet identifier (PID) is assigned to each packet, and start-of-packet and end-of-packet identifiers are added to assist the downstream network processor with packet processing. The reassembler 14 includes a QID-PID table, indexed according to the QID value, having as contents a PID field and a one-bit QID valid field. Thus the table is used to associate a PID value with each QID value. The reassembler 14 reads the block QID value and using this value as an index into the table, selects the associated PID value from the table. The QID valid field indicates whether the QID value is in use, that is, whether the preprocessor 12 has assigned the QID to a packet that is undergoing reassembly. This table is also referred to below as the QID to PID lookup map, since it is used to find the PID value for a packet based on the QID value for the packet.

Figure 2:
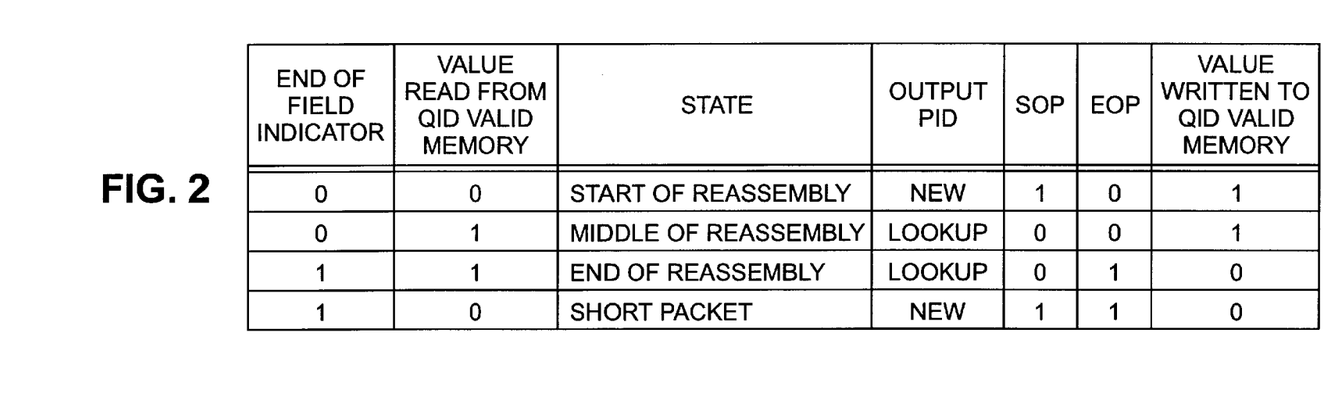
FIG. 2 is a table for use during the reassembly process.

Operation of the reassembler 14 is illustrated using the table of FIG. 2. When a block is received, the reassembler 14 checks the block's end-of frame field to determine whether the block is the last block of a packet. Also, the QID value for the block is obtained from the preprocessor 12, for use in determining the PID value according to the QID-PID table. The assembler then reads the value in the QID valid field of the QID table. See the second column of FIG. 2. If the table indicates that the QID is unassigned, (a zero value in this example) then the reassembler 14 concludes that the present block is the first block of a new packet. In response, the reassembler 14 toggles the value in the QID valid field to indicate that this QID is now in use. The value written to the QID valid memory field is indicated in the last column of FIG. 2. Thus a one value in the QID valid field indicates that this QID value is in use.

Referring to the first line of the FIG. 2 table, where the parameters of an exemplary received block are shown, note that the end of frame indicator is a zero, indicating that the current block is not the last block of a packet. The QID valid field is also a zero, signifying that this is the first block to be assigned this QID value. From these two factors, the reassembler 14 determines that this is the first block of a new packet and the reassembly process for that packet has now begun. Since this is a new packet it is assigned a new PID value by the reassembler 14, as indicated in column four, according to the QID-PID table discussed above. As discussed above, the assembler assigns a start-of-packet and an end-of-packet identifier to each completed packet, by setting the appropriate packet field to one. Thus, as shown in the fifth column of FIG. 2, for this packet the start-of-packet field is set to one by the reassembler 14. The end-of-packet field remains at zero. Finally, the reassembler 14 toggles the one-bit valid field in the QID table.

The second line of the table shows the parameters associated with a second exemplary block of data received by the reassembler 14. This block is not the last block of a packet, thus the end-of-frame field in the data block is a zero. The QID field for the QID assigned to this block contains a one value (see column 2) having been set to that value the first time that QID was encountered by the reassembler 14. Thus, as stated in the third column, this block is from within a packet and the reassembly process is currently processing blocks located between the beginning and the end of the packet. Since a PID has already been assigned to the packet, the PID value is taken from the QID to PID lookup map, using the assigned QID value as an index into the map. Since the current block is neither the start nor the end of the packet, both the start-of-packet and the end-of-packet fields are zero. Since the QID value will continue to be used for subsequent blocks from this packet, the assignment field for the QID value is a one. Subsequently encountered blocks for this packet will have the same parameters as set forth in the second line of the table, until the last block of the packet is encountered.

The last block of the packet is assembled according to the third line of the table. This block has the end-of-frame field set to a one, as indicated in the first tabular column. The QID valid field value is a one as for each of the previous blocks for this packet (except the first block). As for the previous blocks, the PID value is obtained from the QID to PID lookup map, using the QID value as an index into that map. The start-of-packet bit is a zero, but the end-of-packet bit is set to a one, signifying that this is the last block of the packet. When the reassembler 14 processes this block, it resets the value in the valid field of the QID to PID lookup map to a zero, indicating that this QID is available for assignment to another series of blocks comprising a packet.

The fourth line of the FIG. 2 table sets forth the parameters for a packet that is shorter than one block, referred to as a short PDU (protocol data unit) or a short packet. Since the packet is shorter than a block, it's end-of-frame bit is set as the block constitutes the end of the packet. Since the assigned QID value has not been previously assigned to other blocks, this being the first block of the packet, the valid field of the PID to QID table is zero. The block also requires a new PID value, since one was not previously assigned to the packet. The block is both the start and the end of the packet, thus both the start-of-packet and the end-of-packet fields in the block are set. The reassembler 14 also leaves the QID valid field at the zero value, since this QID value is no longer used for this packet.

Figure 3A:
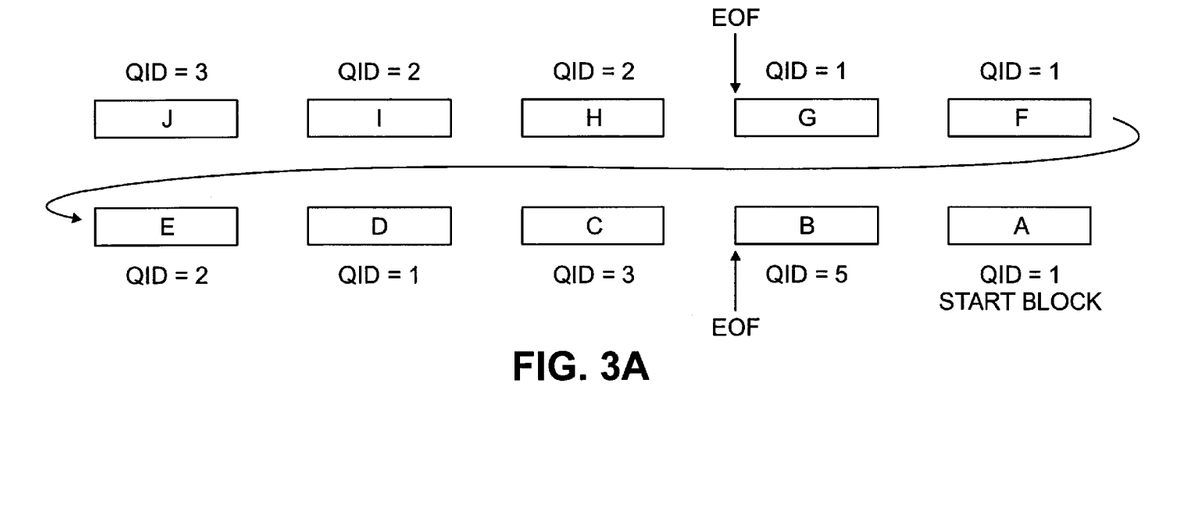
FIGS. 3A and 3B illustrate the packet reassembly process.

FIG. 3A illustrates a plurality of interleaved blocks designated by alphabetical letter. The QID values as assigned by the preprocessor 12 are indicated below the block, and the end-of-frame indicator, as applicable, is also shown. Recall that the first encounter of the reassembler 14 with a QID value having a valid field value of zero indicates that the block is the first one of a new packet. Note that block A is so designated. Blocks E, C, I and J are located intermediate the start and end of their respective packets. The block B is an end-of-frame block for QID=5, and the block G is an end-of-frame block for QID=1.

Figure 3B:
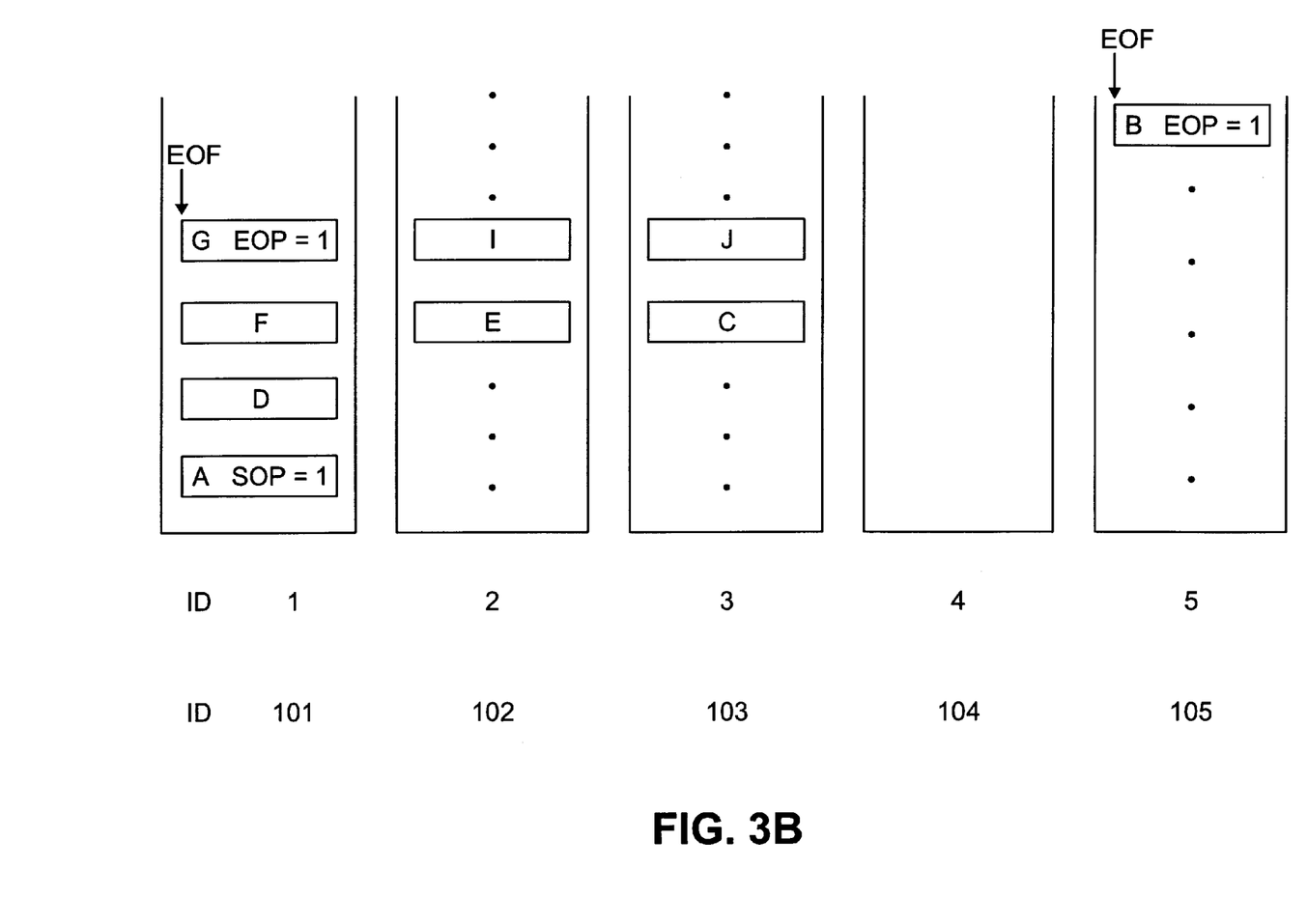

In FIG. 3B the blocks are reassembled into their respective packets, as determined by the QID value. Each QID also has an assigned PID, as indicated in FIG. 3B, for use by the downstream network processing elements. Within this segment of processed blocks there are none with the QID value of 4. The vertical-oriented ellipses indicate that additional blocks precede or follow the blocks within the packet.

Returning to FIG. 1, the reassembled packets from the reassembler 14 are input to a data buffer 26 for storage. A processor 28 analyzes each packet and controls the transmission of data packets from the data buffer 26 to downstream network processors.

The invention is described primarily with respect to same-length data blocks derived from variable-length packets and reassembled into the variable length packets. However, the invention is also applicable to fixed-length ATM data cells. In certain applications it may be desirable for several ATM cells to be assembled into a single unit, also referred to as a packet data unit or a PDU. The present invention can be used in to provide that capability by processing each ATM cell as a data block. For the first ATM cell in the PDU, the header (five bytes) is retained, and thus the block comprises the header plus the entire information segment of the cell, that is, 48 bytes. Each subsequent block comprises only the 48 data bytes. Thus, when the blocks are processed and assembled by the preprocessor 12 and the reassembler 14, into a PDU, each PDU comprises a five byte header followed by a plurality of 48 byte blocks. Network bandwidth is conserved by avoiding transmission of the five byte header with each cell and the concatenation of several cells. To accomplish this, in the preprocessor 12, each ATM cell is assigned the same QID value and all cells with the same QID value are assembled into a single PDU.

Figure 4:
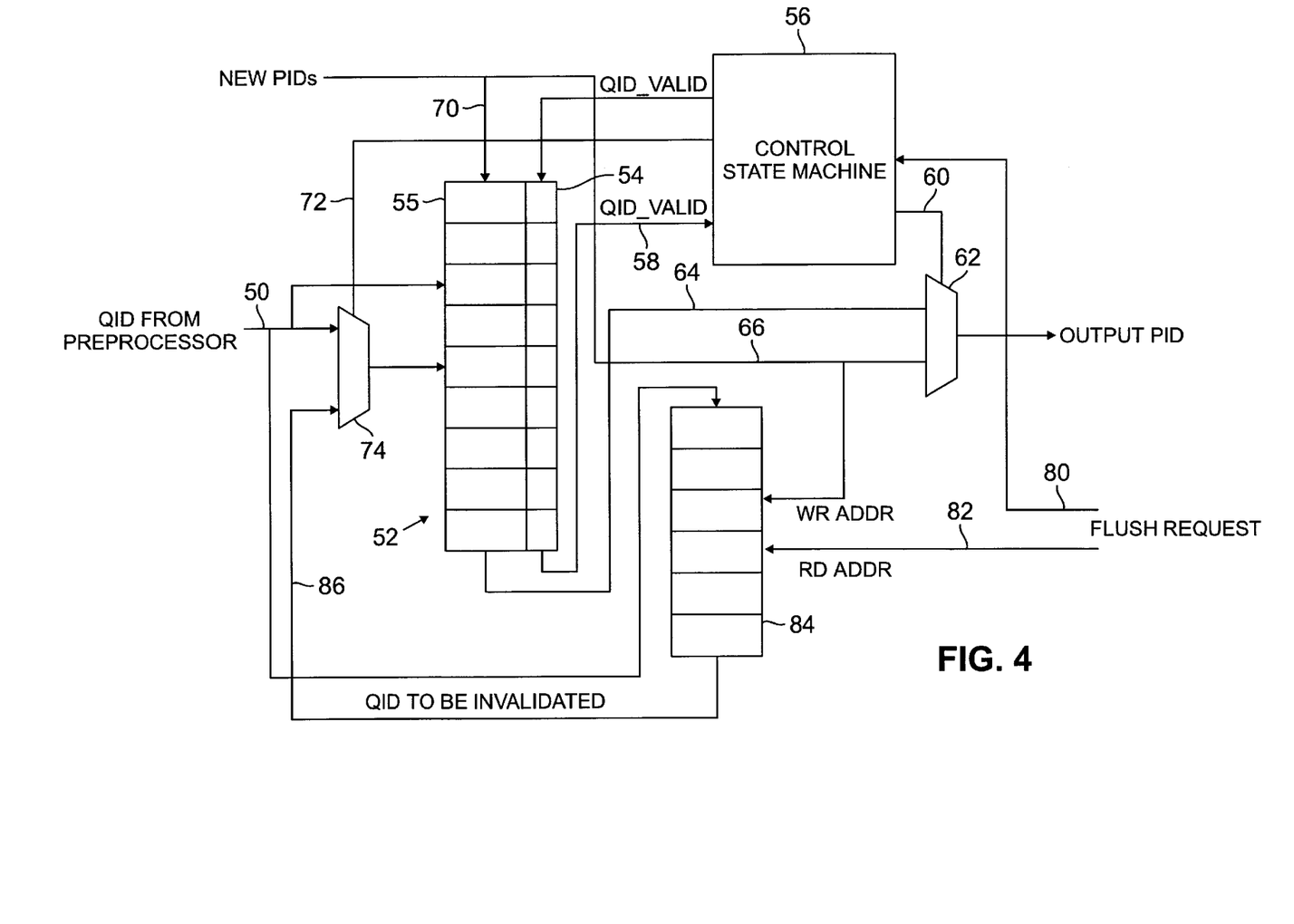
FIG. 4 is a block diagram of the assembler of FIG. 1.

FIG. 4 is a block diagram of the principal components of the reassembler 14. When a block enters the reassembler 14, the QID value is provided to the reassembler 14 by the preprocessor 12. This input, indicated by a reference character 50 of FIG. 4, serves as the read address into a QID to PID lookup map 52, including QID valid fields 54 and a PID fields 55. The read address is an index into the QID to PID map 52, the indexed QID valid field 54 is read and the value in the valid field is input to a control state machine 56 over a link 58. As discussed above, the QID valid field value determines whether a new PID is assigned to the packet being reassembled or whether the PID was previously assigned and is therefore determined from the QID to PID lookup map 52.

An output link 60 from the control state machine 56 carries a control signal, determined by the QID valid field value input thereto. The control signal has a first value if the value of the QID valid field indicates that a new PID assignment is required, and a second value if the QID valid field indicates that the PID is available from the QID to PID lookup map 52. The output link 60 serves as the control input to a multiplexer 62, having two data input terminals 64 and 66. The input terminal 64 is responsive to the PID value read from the PID field 55, using the input QID value as an index. The input terminal 66 is responsive to new PID values provided from an external source as shown. Thus the multiplexer 62 provides an output value that is determined by the control signal on the output link 60. If the QID assignment field 54 indicates that a new PID value is required, the control signal causes the multiplexer 62 to output the new PID value present at the input terminal 66. If the QID valid field value indicates that the PID value for the block was previously determined, then the multiplexer control signal causes the muliplexer output to take on the PID value from the PID field 55, as present on the input terminal 66.

Whenever a new PID value is applied to the block, it must be written to the QID to PID lookup map 52 for use by subsequent blocks associated with the same QID. The new PID values are input to the QID to PID lookup map 52 via a link 70. When a new PID value is activated, a control signal is provided by the control state machine 56 to a control terminal 72 of a multiplexer 74., causing the output of the multiplexer 74 to take on the QID value on the multiplexer input line 50. The multiplexer output serves as a write address index to write the new PID value to the QID to PID lookup map 52, thus associating the new PID value with the QID value of the present block.

In one embodiment, the reassembler 14 is sized to accommodate approximately 4000 sources. Therefore, 4000 packets can be simultaneously reassembled and the QID to PID lookup map 52 comprises 4000 memory locations, (i.e., 4000 QID values and 4000 PID values), each thirteen bits long, i.e. Twelve bits ($2^{12}$=4096) for the PID value as stored in the PID field 55 and one bit for the QID valid field 54.

Network errors upstream of the preprocessor 12 and the reassembler 14 can occasionally cause the loss of individual blocks or the remainder of a packet. This requires flushing the corrupted packet from the system, which frees up the PID value of the flushed packet. To accomplish this packet flush, an additional table is added to the FIG. 4 logic for mapping the PID values back to the QID. Thus when a downstream network processor issues a flush request due to a problem with the packet, i.e., an incomplete packet caused by missing blocks or corrupted packet blocks, the QID associated with the PID can be invalidated and the PID freed for reuse.

The flush request is issued to the reassembler 14 and includes the PID of the packet that is being deleted from the downstream processor. In response to this flush request any remaining blocks of the lost packet are deleted from the buffer 26, where they are stored awaiting transmission to the next network processor in the signal path. To accomplish this deletion procedure the QID value of the flushed packet must be determined so that all the blocks with that QID value can be identified in the data buffer and deleted. The returned PID value is used to determine the corresponding QID value by consulting a PID to QID lookup map, using the PID value as an index into the map. The QID value is then determined and any blocks associated with that QID are deleted from the buffer 26. The QID value is also invalidated.

Later arriving blocks of the flushed packet, which can be determined based on the input port/packet source information, at the preprocessor 12 or the reassembler 14 are discarded based on the assigned QID. Recall that the PID to QID map previously identified the QID of the blocks that were flushed. Reassembly of a packet and assignment of a new QID begins only when a start of a packet or first block identifier is presented. Since these later-arriving blocks do not include the first block they will trigger the reassembly process.

According to FIG. 4, a flush request from an upstream network processor is input to the reassembler 14 in the form of a flush signal carried on a link 80 and the PID value of the flushed packet carried on a link 82. A PID to QID lookup map 84 includes all the assigned QID values, indexed according to the matching PID value. Values were previously loaded into the PID to QID lookup map 84 simultaneously with the populating of the QID to PID lookup map 52. Thus the PID value from the upstream processor on the link 82 is an index into the PID to QID lookup map 84, for determining the QID value of the blocks to flush. This QID value is input to the multiplexer 74 at an input terminal 86 thereof The control signal for the multiplexer 74, as provided by the control state machine 56, causes the signal on the input terminal 86 to be switched to the output and thus serve as a write address into the QID to PID lookup map 52 to turn off the bit in the QID assignment field 54. If later, additional blocks associated with the flushed PID are input to the reassembler 14, a new QID and a new PID are assigned and the blocks are reassembled until the end of frame indicator is encountered. But upstream processors will recognize that the packet is not complete and discard the incomplete packet.

Figure 5:
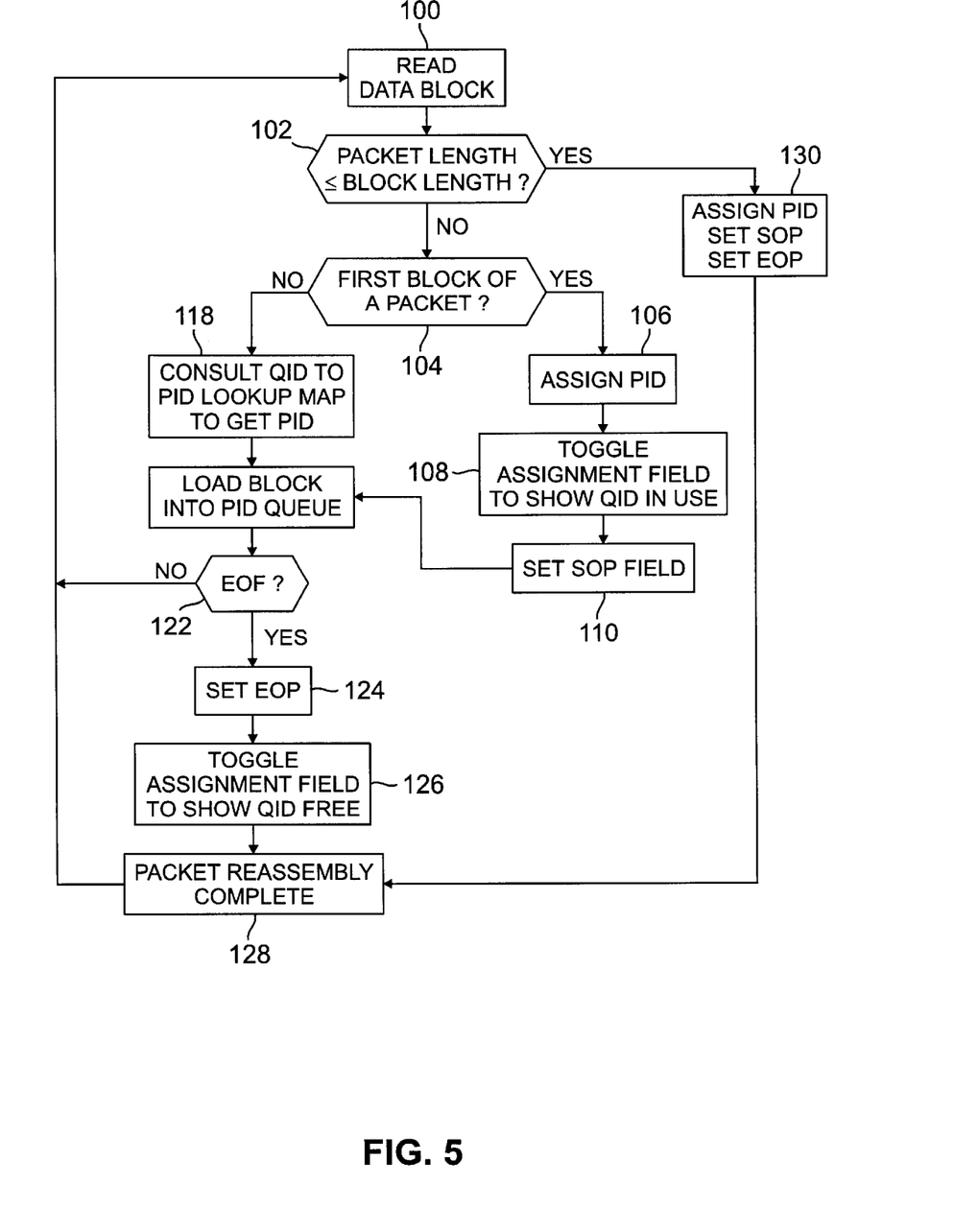
FIG. 5 is a flowchart depicting the reassembly process.

FIG. 5 is a flowchart describing the reassembly steps according to the teachings of the present invention. At a step 100, the next data block is read from among the plurality of interleaved data blocks. At a decision step 102 the data block is examined to determine whether it represents a complete packet, that is, whether the packet length is equal to or shorter than the block length. If the answer from the decision step 102 is negative, then the process moves to a decision step 104 for determining whether the current data block is the first data block for a new packet. As discussed above, this is accomplished by first determining the QID assigned to the data block then checking the QID's valid field. The valid field value reveals whether the data block is the first one of the packet. In the preferred embodiment, a zero value in the QID valid field is a first block indicator.

If the block is the first block of the packet, then a new PID value is assigned at a step 106. Then at a step 108 the assignment field for the block's QID is toggled to a binary one to indicate that the QID is in use. Since this is the first block of a new packet, the start-of-packet field is set to one at a step 110.

Returning to the decision step 104, if the block is not the first block of a packet, then the process continues to a step 118 where the QID to PID lookup map is consulted to identify the PID for the packet to which the present block belongs. At a step 120 all data blocks, both the first and the subsequent data block are written to their assigned memory locations, as determined by the assigned PID value, in the data buffer 16.

Following each of the step 120, the process continues to a decision step 122 to check whether the current block includes the end-of-field indicator. A negative result returns the process to the step 100 where the next block is read for processing. If the current block includes the end-of-field indicator, then the process continues to a step 124 where the packet end-of-packet indicator is set. This indicator is useful to downstream components to identify the end of a packet. The QID assignment field can now be toggled to zero, at as step 126, to free the QID for assignment to another data block. A step 128 indicates that reassembly of the packet is complete and it is ready to be transferred to the downstream component.

Returning to the decision step 102, if the result is positive, then the current packet is shorter than a block and must therefore include the end-of-packet indicator. At a step 130, a new PID is assigned, and the start-of-packet and the end-of-packet indicators are set. The process then continues to the step 128 as the reassembly of this packet is complete. The process also returns to the read data block step 100 following the step 128

In the preferred embodiment discussed above, several references are made to binary values in data fields serving as indicators for a predetermined action. Those skilled in the art recognize that either a binary one or a binary zero can be used to identify the predetermined action. Thus in those cases where a binary one is identified as an indicating value, a binary zero can be substituted in another embodiment, if the corresponding changes are made to the interpreting processor or software element.

What is claimed is:

1. For a plurality of data packets segmented into one or more data blocks, a method for reassembling the data blocks into their respective data packets, said method comprising:

receiving a data block;

assigning the same queue identifier to each data block from the same packet;

grouping together all data blocks having the same queue identifier; and assigning a packet identifier to each data block, wherein all data blocks reassembled into the same packet are assigned the same packet identifier.

2. The method of claim 1 wherein an assembled packet includes the packet identifier of the data blocks comprising the packet.

3. The method of claim 1 wherein prior to assignment of the queue identifier, the data blocks of one data packet are interleaved with the data blocks of other data packets.

4. The method of claim 1 wherein the steps of reassembling the data blocks are executed in a first network processor, and wherein the reassembled data packet is input to a second network processor, and wherein the packet identifier is provided to the second network processor with the reassembled data packet.

5. The method of claim 1 wherein the steps of reassembling the data blocks into data packets are followed by additional data processing steps, and wherein the packet identifier is associated with the data packet during the additional data processing steps.

6. The method of claim 1 further comprising canceling the assignment of the queue identifier to the packet after the packet has been reassembled.

7. The method of claim 1 wherein a queue identifier valid field is associated with each queue identifier, and wherein when the first block of a packet is assigned a queue identifier, the method further comprising setting the valid field value for the assigned queue identifier to a first value.

8. The method of claim 6 further comprising setting the valid field for the queue identifier to a second value after the last block of the packet is processed.

9. The method of claim 1 further comprising assigning a new packet identifier to the data block when the received data block is the first data block of a data packet, and further comprising when the received data block is not the first data block of a packet, determining the packet identifier to assign to the data block by consulting a lookup table, wherein the assigned queue identifier serves as an index into the lookup table, and wherein the values in the lookup table comprise packet identifiers.

10. The method of claim 1 wherein each packet identifier is associated with a data storage buffer, and wherein the step of grouping the data blocks comprises storing the data blocks in the storage buffer associated with the assigned packet identifier during the packet reassembly process.

11. The method of claim 1 wherein certain of the data blocks include identifying indicators.

12. The method of claim 11 wherein the identifying indicators comprise an end of file indicator identifying the last data block of a data packet, and wherein the reassembly process for the data packet terminates when the last data block is received.

13. The method of claim 12 wherein reassembly of the data packet is complete when the data block identified as the last data block of the data packet is grouped with the other data blocks of the data packet.

14. The method of claim 11 further comprising the step of including a start-of-packet identifier with each data packet in response to an identifying indicator in a data block, wherein the identifying indicator indicates that the data block is the first data block of a data packet.

15. The method of claim 11 further comprising the step of including a end-of-packet identifier with each data packet in response to an identifying indicator in a data block, wherein the identifying indicator indicates that the data block is the last data block of a data packet.

16. The method of claim 11 wherein the identifying indicators comprise an end of file indicator identifying the last data block in a data packet, and wherein the step of assigning the queue identifier further comprises assigning the same queue identifier to each block from a single packet until the end of file indicator is encountered.

17. The method of claim 1 further comprising the step of receiving a flush request for a data packet and in response thereto, deleting all data blocks grouped according to the step of grouping together all data blocks having the same queue identifier.

18. The method of claim 17 wherein the flush request includes the packet identifier of the data packet to be flushed, further comprising consulting a lookup table using the packet identifier as an index into the table to determine the queue identifier associated with the received packet identifier, and flushing the data blocks associated with the determined queue identifier.

19. The method of claim 1 wherein when a data packet is shorter than a data block, and wherein the data block includes an end-of-field identifying indicator, assigning a packet identifier to the data block, and further assigning a start-of-packet and an end-of-packet identifier to the data packet.

20. An apparatus for reassembling data blocks back into the data packets from which they were partitioned, said apparatus comprising:
 a preprocessor for assigning the same queue identifier to each data block from the same packet;
 a reassembler for grouping together all data blocks having the same queue identifier and for assigning a packet identifier to each data block, wherein all data blocks reassembled into the same packet are assigned the same packet identifier; and
 a data buffer for storing the data blocks according to the assigned packet identifier.

21. The apparatus of claim 20 including a lookup map for determining the packet identifier based on the queue identifier assigned to the data blocks.

22. The apparatus of claim 21 wherein the lookup map further comprises a field associated with each queue identifier indicating whether the queue identifier is valid for assignment to data blocks.

23. The apparatus of claim 22 wherein the lookup map comprises a table including queue identifiers and the associated packet identifier, and wherein the queue identifier serves as the index into the table for determining the packet identifier.

24. The apparatus of claim 22 wherein the lookup map is populated with new packet identifiers as packet identifiers are assigned to packets and deleted from the table.

25. The apparatus of claim 20 further comprising a lookup map for determining the queue identifier based on the packet identifier assigned to a data block, and wherein in response to a flush request for flushing data blocks associated with a data packet identifier from the data buffer, the packet identifier serves as the index into the table to determine the queue identifier of the data blocks to be flushed.

* * * * *